United States Patent
Cho et al.

(10) Patent No.: US 8,729,393 B2
(45) Date of Patent: May 20, 2014

(54) UNCROSSLINKED POLYETHYLENE COMPOSITION FOR POWER CABLE

(75) Inventors: Kyucheol Cho, Seoul (KR); Moonseok Lee, Daejeon (KR); Hongdae Kim, Seoul (KR); Sungseok Chae, Daejeon (KR)

(73) Assignees: SK Innovation Co., Ltd. (KR); SK Global Chemical Co., Ltd. (KR)

( * ) Notice: Subject to any disclaimer, the term of this patent is extended or adjusted under 35 U.S.C. 154(b) by 360 days.

(21) Appl. No.: 13/258,818

(22) PCT Filed: Mar. 22, 2010

(86) PCT No.: PCT/KR2010/001738
§ 371 (c)(1),
(2), (4) Date: Sep. 22, 2011

(87) PCT Pub. No.: WO2010/110559
PCT Pub. Date: Sep. 30, 2010

(65) Prior Publication Data
US 2012/0012363 A1    Jan. 19, 2012

(30) Foreign Application Priority Data
Mar. 24, 2009  (KR) .................. 10-2009-0025128

(51) Int. Cl.
*H01B 7/00* (2006.01)
(52) U.S. Cl.
USPC ............... 174/110 R; 174/120 R; 174/120 C
(58) Field of Classification Search
USPC ............... 174/110 R–110 E, 120 R, 120 SC, 174/120 AR, 121 AR
See application file for complete search history.

(56) References Cited

U.S. PATENT DOCUMENTS

| 4,426,497 | A | | 1/1984 | Kent | |
|---|---|---|---|---|---|
| 6,130,385 | A | * | 10/2000 | Tuunanen et al. | 174/110 PM |
| 6,228,917 | B1 | | 5/2001 | Keogh | |
| 6,231,978 | B1 | * | 5/2001 | Keogh | 428/378 |
| 6,284,178 | B1 | | 9/2001 | Russell et al. | |
| 6,329,465 | B1 | * | 12/2001 | Takahashi et al. | 525/191 |
| 2003/0008143 | A1 | | 1/2003 | Castellani et al. | |
| 2003/0113496 | A1 | * | 6/2003 | Harris et al. | 428/36.9 |
| 2003/0173104 | A1 | * | 9/2003 | Dell'Anna et al. | 174/126.1 |
| 2005/0119414 | A1 | * | 6/2005 | Sasagawa et al. | 525/242 |
| 2008/0114131 | A1 | * | 5/2008 | Harris et al. | 525/240 |
| 2008/0317990 | A1 | | 12/2008 | Runyan et al. | |

FOREIGN PATENT DOCUMENTS

| JP | 10-334740 | 12/1998 |
|---|---|---|
| JP | 11-176250 | 7/1999 |
| JP | 2002-109970 | 4/2002 |
| KR | 1020080031920 | 4/2008 |

OTHER PUBLICATIONS

International Search Report—PCT/KR2010/001738 dated Oct. 26, 2010.

* cited by examiner

*Primary Examiner* — William H Mayo, III
(74) *Attorney, Agent, or Firm* — Cantor Colburn LLP

(57) ABSTRACT

The present invention is an uncrosslinked linear medium-density polyethylene resin composition for a power cable, which is applicable to an insulating layer, a semi-conducting layer or a sheath layer. Specifically, the uncrosslinked polyethylene composition includes: 100 parts by weight of a polymer having a linear medium-density polyethylene resin having an α-olefin having 4 or more carbon atoms as a comonomer and having a melt index of 0.6-2.2 g/10 min (at 190° C. under a load of 5 kg), a differential scanning calorimetry (DSC) enthalpy of 130-190 joule/g and a molecular weight distribution of 2-30; and 0.1 to 10 parts by weight of one or more additive(s) selected from a flame retardant, an oxidation stabilizer, a UV stabilizer, a heat stabilizer and a process aid.

15 Claims, No Drawings

UNCROSSLINKED POLYETHYLENE COMPOSITION FOR POWER CABLE

TECHNICAL FIELD

The present invention relates to uncrosslinked polyethylene composition for a power cable in which the crosslinked polyethylene widely used in the world for insulation of a power cable is replaced with uncrosslinked type polyethylene resin.

BACKGROUND ART

Until 1950s, uncrosslinked type polyethylene resin was mainly used for insulation of a power cable, but it was problematic in long-term heat resistance and durability. Since the development of curing technique for improving long-term heat resistance and durability of polyethylene by Union Carbide (USA) in the 1950s, power cables are mostly prepared with crosslinked polyethylene.

Polyethylene is crosslinked by a chemical reaction using an organic peroxide or silane (U.S. Pat. No. 6,284,178) or by the use of an electron beam (U.S. Pat. No. 4,426,497). Currently, in the cable industry, crosslinked polyethylene is prepared mostly by crosslinking using an organic peroxide.

Since crosslinked polyethylene resin is thermoset resin, it has superior heat resistance and chemical resistance as well as good electrical properties.

However, crosslinked polyethylene resin causes environmental pollution because the thermoset resin is unrecyclable. Thus, there is a need of environment-friendly un-crosslinked type thermoplastic polyethylene resin. But, because of noticeably worse heat resistance, it is restricted to be used for insulation of power cables.

Nevertheless, in some European countries including France, thermoplastic polyethylene resin is used for insulation of power cables to avoid the environmental problem of the crosslinked polyethylene resin.

In production of power cables with polyethylene crosslinked by an organic peroxide, the process of crosslinking is essential. The crosslinking process requires a high-pressure, high-temperature condition and has very low productivity. Even a slight change in the process condition may result in degraded product uniformity because of nonuniform crosslinkage.

During the crosslinking process, an organic peroxide is decomposed by heat and radicals which carry out crosslinking are produced therefrom. In this process, cumyl alcohol, methane, or the like are produced as byproduct and form bubbles in the insulator. To remove them, a high pressure of at least 5 atm should be applied. If left unremoved, the bubbles may result in breakage of the insulator.

Since Korea is surrounded by the sea on three sides, the air contains a lot of salts, which often erode the insulator of overhead power cables and result in fire. The erosion of the power cable insulator is called failure by tracking. It is an intrinsic phenomenon of the organic insulator whereby conducting paths formed on the surface of the insulator by the carbonization product results in surface dielectric breakdown. Although it is triggered by heat resulting from surface discharge or scintillation discharge, various causes are associated with its generation, including moisture, salts, acid rain, inorganic or fibrous dusts, chemicals, or the like.

DISCLOSURE OF INVENTION

Technical Problem

An object of the present invention is to provide a composition for preparation of a power cable, which has superior discharge property, in particular tracking resistance, while maintaining the most important and basic electrical properties for power cable insulator such as insulating property and dielectric property.

More specifically, the present invention is directed to providing a composition including uncrosslinked type polyethylene resin, which is recyclable thus being environment-friendly and capable of remarkably reducing production cost. Thus, the present invention is directed to providing a composition including linear medium-density polyethylene including α-olefin with 4 or more carbon atoms as a comonomer in order to improve long-term heat resistance and durability over existing polyethylene resin.

Another object of the present invention is to provide a composition further including a high-density polyethylene resin with specific properties in order to further improve the electrical properties.

Another object of the present invention is to provide a composition which is applicable not only to the insulator but also to a semi-conducting layer or a sheath layer.

Solution to Problem

To achieve the aforesaid objects, the present invention provides uncrosslinked polyethylene composition for a power cable including: 100 parts by weight of a polymer including a linear medium-density polyethylene resin including an α-olefin having 4 or more carbon atoms as a comonomer and having a melt index of 0.6-2.2 g/10 min (at 190° C. under a load of 5 kg), a differential scanning calorimetry (DSC) enthalpy of 130-190 joule/g and a molecular weight distribution of 2-30; and 0.1 to 10 parts by weight of one or more additive(s) selected from a flame retardant, an oxidation stabilizer, a UV stabilizer, a heat stabilizer and a process aid.

The composition may also include 5 to 40 wt % of a high-density polyethylene resin having a melt index of 0.1-0.35 g/10 min (at 190° C. under a load of 5 kg), a DSC enthalpy of 190-250 joule/g and a molecular weight distribution of 3-30, based on 100 parts by weight of the polymer. That is to say, the linear medium-density polyethylene resin may be used alone or in combination with a high-density polyethylene resin. When the linear medium-density polyethylene resin is used in combination with the high-density polyethylene resin, the composition may include 60 to 95 wt % of the linear medium-density polyethylene resin and 5 to 40 wt % of the high-density polyethylene resin.

Further, 1 to 5 parts by weight carbon black may be further included, based on 100 parts by weight of the polymer, if necessary.

That is to say, uncrosslinked polyethylene composition according to a first embodiment of the present invention includes: 100 parts by weight of a linear medium-density polyethylene resin including an α-olefin having 4 or more carbon atoms as a comonomer and having a melt index of 0.6-2.2 g/10 min (at 190° C. under a load of 5 kg), a DSC enthalpy of 130-190 joule/g and a molecular weight distribution of 2-30; and 0.1 to 10 parts by weight of one or more additive(s) selected from a flame retardant, an oxidation stabilizer, a UV stabilizer, a heat stabilizer and a process aid.

Uncrosslinked polyethylene composition according to a second embodiment of the present invention includes: 100 parts by weight of a polymer including 60 to 95 wt % of a linear medium-density polyethylene resin including an α-olefin having 4 or more carbon atoms as a comonomer and having a melt index of 0.6-2.2 g/10 min (at 190° C. under a load of 5 kg), a DSC enthalpy of 130-190 joule/g and a molecular weight distribution of 2-30 and 5 to 40 wt % of a high-density polyethylene resin having a melt index of 0.1-0.35 g/10 min (at 190° C. under a load of 5 kg), a DSC enthalpy of 190-250 joule/g and a molecular weight distribution of 3-30; and 0.1 to 10 parts by weight of one or more additive(s) selected from a flame retardant, an oxidation stabilizer, a UV stabilizer, a heat stabilizer and a process aid.

Uncrosslinked polyethylene composition according to a third embodiment of the present invention includes: 100 parts by weight of a linear medium-density polyethylene resin including an α-olefin having 4 or more carbon atoms as a comonomer and having a melt index of 0.6-2.2 g/10 min (at 190° C. under a load of 5 kg), a DSC enthalpy of 130-190 joule/g and a molecular weight distribution of 2-30; 0.1 to 10 parts by weight of one or more additive(s) selected from a flame retardant, an oxidation stabilizer, a UV stabilizer, a heat stabilizer and a process aid; and 1 to 5 parts by weight of carbon black.

Uncrosslinked polyethylene composition according to a fourth embodiment of the present invention includes: 100 parts by weight of a polymer including 60 to 95 wt % of a linear medium-density polyethylene resin including an α-olefin having 4 or more carbon atoms as a comonomer and having a melt index of 0.6-2.2 g/10 min (at 190° C. under a load of 5 kg), a DSC enthalpy of 130-190 joule/g and a molecular weight distribution of 2-30 and 5 to 40 wt % of a high-density polyethylene resin having a melt index of 0.1-0.35 g/10 min (at 190° C. under a load of 5 kg), a DSC enthalpy of 190-250 joule/g and a molecular weight distribution of 3-30; 0.1 to 10 parts by weight of one or more additive(s) selected from a flame retardant, an oxidation stabilizer, a UV stabilizer, a heat stabilizer and a process aid; and 1 to 5 parts by weight of carbon black.

The present invention further provides a power cable having one of the aforedescribed composition applied to an insulating layer, a semi-conducting layer or a sheath layer.

Advantageous Effects of Invention

The present invention provides uncrosslinked type polyethylene resin composition, which is recyclable thus being environment-friendly and has superior insulating property, dielectric property and discharge property as well as good heat resistance.

BEST MODE FOR CARRYING OUT THE INVENTION

Hereinafter, the embodiments of the present invention will be described in detail with reference to accompanying drawings.

In the present invention, α-olefin comonomer is used to induce formation of tie-molecules so as to remarkably enhancing long-term heat resistance and durability without curing of polyethylene. Besides, selected additives are added to improve heat resistance. Further, in order to maintain the most important and basic electrical properties, i.e. insulating property and dielectric property, particularly to improve tracking resistance, a linear medium-density polyethylene resin comprising α-olefin comonomer is compounded with a high-density polyethylene resin.

The linear medium-density polyethylene resin comprises an α-olefin having 4 or more carbon atoms as a comonomer. The α-olefin having 4 or more carbon atoms is selected from butene, pentene, methylpentene, hexene, octene and decene.

And, the linear medium-density polyethylene resin has a melt index (hereinafter, MI) of 0.6-2.2 g/10 min (at 190° C. under a load of 5 kg). If the MI is below 0.6 g/10 min, it is uneconomical because productivity of polymerization decreases. And, if the MI exceeds 2.2 g/10 min, tracking resistance is degraded. More preferably, a superior tracking resistance is obtained when the MI is 1.4-1.9 g/10 min.

Further, the linear medium-density polyethylene resin has a differential scanning calorimetry (DSC) enthalpy of 130-190 joule/g. If the DSC enthalpy is below 130 joule/g, long-term heat resistance is degraded. And, if the DSC enthalpy exceeds 190 joule/g, creep property is degraded. More preferably, a superior creep property is obtained when the DSC enthalpy is 150-190 joule/g.

In addition, the linear medium-density polyethylene resin has a molecular weight distribution of 2-30. If the molecular weight distribution is below 2, melt fracture may occur on the surface during processing of a power cable. And, if it exceeds 30, polymerization of polyethylene becomes difficult. More preferably, synthesis of resin and processing of the resin into a power cable are easier when the molecular weight distribution is 3.5-23.

The linear medium-density polyethylene resin comprising an α-olefin having 4 or more carbon atoms as a comonomer is capable of overcoming the disadvantage of existing polyethylene. Specifically, it may be prepared to have a lamellar thickness of 100 or larger, so that it can endure a hoop stress of 3.5 MPa in a 95° C. water bath for over 2,000 hours and has impact strength of at least 1,250 and 1,700 kg/cm at room temperature (23° C.) and low temperature (−40° C.), respectively.

During polymerization of the linear medium-density polyethylene resin, the α-olefin induces formation of tie-molecules which form bonds with the carbon main chain and strongly link the crystalline portion and the amorphous portion of the resin, and, thereby, enhances long-term heat resistance and electrical properties.

The linear medium-density polyethylene resin may be used alone, but, in order to provide more superior insulating property, in particular tracking resistance, it may be used in combination with a high-density polyethylene resin having an MI of 0.1-0.35 g/10 min (at 190° C. under a load of 5 kg), a DSC enthalpy of 190-250 joule/g and a molecular weight distribution of 3-30. A superior tracking resistance may be attained when 60 to 95 wt % of the linear medium-density polyethylene resin is used along with 5 to 40 wt % of the high-density polyethylene resin. If the content of the linear medium-density polyethylene resin is below 60 wt % or if the content of the high-density polyethylene resin exceeds 40 wt %, creep property may be degraded. And, if the content of the linear medium-density polyethylene resin exceeds 95 wt % or if the content of the high-density polyethylene resin is below 5 wt %, tracking resistance may not be improved significantly.

The high-density polyethylene resin has an MI of 0.1-0.35 g/10 min (at 190° C. under a load of 5 kg). If the MI is below 0.1 g/10 min, processability with existing facilities is not good and productivity decreases. And, if the MI exceeds 0.35 g/10 min, improvement of tracking resistance is insignificant. More preferably, tracking resistance is superior when the MI is 0.2-0.3 g/10 min (at 190° C. under a load of 5 kg).

If the high-density polyethylene resin has a DSC enthalpy below 190 joule/g, improvement of long-term heat resistance is insignificant. And, if the DSC enthalpy exceeds 250 joule/g, long-term creep property is degraded. More preferably, superior long-term creep property is attained when the DSC enthalpy is 200-220 joule/g.

And, the high-density polyethylene resin has a molecular weight distribution of 3-30. If the molecular weight distribution is below 3, processability is degraded. And, if the molecular weight distribution exceeds 30, improvement of long-term heat resistance is insignificant. More preferably, superior long-term heat resistance is attained when the molecular weight distribution is 5-23.

The linear medium-density polyethylene resin and the high-density polyethylene resin may have either unimodal or bimodal distribution of molecular weight and density.

The composition of the present invention comprises 0.1 to 10 parts by weight of one or more additive(s) selected from a flame retardant, an oxidation stabilizer, a UV stabilizer, a heat stabilizer and a process aid. Preferably, the additive is used in an amount of 0.1-10 parts by weight based on 100 parts by weight of the resin. If it is used in an amount less than 0.1 part by weight, decomposition of the polymer may be accelerated at more than 20,000 hours. And, if it is used in an amount exceeding 10 parts by weight, mechanical properties of the insulator may be degraded.

The oxidation stabilizer, the UV stabilizer and the heat stabilizer are used to improve long-term creep property during transport, storage and use of a power cable. As specific examples, hindered phenols, phosphites, benzophenones, hindered amine light stabilizers (HALS) or thioesters may be used.

The flame retardant is used to provide flame retardancy. As specific examples, aluminum hydroxide, magnesium hydroxide or nanoclay may be used.

The process aid is used to improve heat resistance and reduce process load. As specific examples, fluoroelastomers or fluoroolefin copolymers may be used.

The composition of the present invention may further comprise carbon black in order to semi-conducting property and long-term weatheribility. Preferably, it is used in an amount of 1 to 5 parts by weight based on 100 parts by weight the polymer. If the carbon black is used in an amount less than 1 part by weight, decomposition of the polymer may be accelerated at more than 20,000 hours. And, if is used in an amount exceeding 5 parts by weight, mechanical properties of the insulator may be degraded. Superior compatibility may be attained when the carbon black is mixed with the resin to form a master batch.

The insulating layer of a cable may not include carbon black, since it should have insulating property and is not affected, for example, by UV.

MODE FOR THE INVENTION

The examples and experiments will now be described. The following examples and experiments are for illustrative purposes only and not intended to limit the scope of the present invention.

Electrical properties (insulating property, dielectric property and discharge property) of the composition of the present invention were evaluated as follows.

TABLE 1

Test of electrical properties

| Test item | | Test method |
|---|---|---|
| Insulating property | Dielectric breakdown | ASTM D149, IEC 243 |
| | Resistance | ASTM D257 |
| Dielectric property | Permittivity | ASTM D150, IEC 250 |
| | Dielectric loss | |
| Discharge property | Tracking resistance | IEC 60112, IEC 60587, ASTM D2303, ASTM D2132 | a. Dielectric Breakdown Test

Dielectric breakdown test evaluates endurance against voltage. A better endurance against dielectric breakdown voltage means a better insulating property.

Test Method

Dielectric breakdown test was carried out while raising voltage at 500 V/s. To attain a Weibull distribution and to reduce error, the number of samples increased as many as possible. The electrode of the measuring apparatus was rounded to prevent electric field concentration at the edge and the test was performed in insulating oil to prevent discharge of air layer. Test specimen was prepared to have a sufficiently large area of at least 10 cm×10 cm in order to prevent direct conduction with the electrode.

b. Insulation Resistance Test

Insulation resistance (volume resistivity, [Ωm]) is also an important property of an insulating material for a high-voltage cable. It is a measure of how strongly a material opposes the flow of electric current. A higher insulation resistance indicates a superior insulating material.

Test Method

Test specimen was mounted in a cell under a load of 10 kgf. After applying a voltage of 500 V, insulation resistance measurement was made 1 minute later. The test specimen was prepared to have a thickness of about 1 mm. Measurement was made for 5 specimens and the result was averaged.

c. Permittivity Test

Korea uses alternating current (AC) for distribution of power. It is because AC is advantageous over direct current (DC) in that stable supply of voltage is possible. Thus, permittivity of an insulating material of a power cable is very important. The permittivity is closely related to distribution performance and failure of the power cable. A lower permittivity indicates a superior insulating material.

Test Method

A dielectric analyzer (DEA) was used to measure permittivity. Test specimen was prepared to have a length of about 200 μm and silver paste was applied on the surface of the specimen to minimize contact resistance. Measurement was made at 1 MHz and at room temperature.

d. Dielectric Loss Test

Dielectric loss is very important for an AC power cable and is important in predicting the performance and failure of the cable. In particular, since the dielectric loss of an insulating material is closely related with an actual accident, selection of an insulating material with low dielectric loss is essential in designing a cable.

Test Method

Dielectric loss test was performed in the same manner as the permittivity test. A DEA was used and test specimen was prepared to have a length of about 200 μm. Silver paste was applied on the surface of the specimen to minimize contact resistance and measurement was made at $10^{-1}$ to $10^7$ Hz and at room temperature.

e. Tracking Resistance Test

Tracking resistance test is a test to predict operation life an insulating material under a harsh environment. It is an accelerated test simulating failure, for example, by salts under a high voltage.

Test Method

Tracking resistance test was performed according to IEC 60587. Of the constant tracking voltage method and the stepwise tracking voltage method under the standard, the constant tracking voltage method was selected. Test specimen was prepared using a hot press to have a size of 50 mm×120 mm×6 mm, and an aqueous solution of 0.1 wt % $NH_4Cl$+0.02 wt % non-ionic agent (Triton X-100) was used as a contaminant solution. Five specimens were fixed with a slope angle of 45 from the ground surface. While flowing the contaminant solution at a rate of 0.6 mL/min, a voltage of 4.5 kV was applied between two electrodes. It was observed whether failure occurred within 6 hours (Class 1A 4.5 of IEC 60587). The result was evaluated as pass or fail.

f. Heat Resistance Test I

Heat resistance of a power cable insulator was tested according to KEPCO Standard ES-6145-0006. As specified in 4.3.5 of the standard, room temperature test was performed according to KSC 3004, 19 and elevated temperature test was performed according to KSC 3004, 20 (elevated temperature). For the elevated temperature test, test specimen was placed in a convection oven of 120° C. for 120 hours and, after keeping at room temperature (24° C.) for 4 hours, tensile strength and elongation were measured within 10 hours.

g. Heat Resistance Test II

Long-term heat resistance of a power cable insulator was tested according our own method.

Test was performed similarly to heat resistance test I, except that the test specimen was placed in a convection oven of 110° C. for 5,000 or 10,000 hours and, after keeping at room temperature (24° C.) for 4 hours, elongation were measured within 10 hours.

h. Processability Test

Extrusion was carried out using a twin screw extruder (screw diameter=19 mm, L/D=20, counter rotating, Brabender, Germany), with barrel temperature at 190/200/210° C. and screw RPM at 60. Surface appearance of the extruded strand was observed.

i. Weather Resistance Test

Weather resistance test was performed using a UV tester (QUV, Q Pannel). Accelerated test was carried out, with one cycle consisting of UV radiation for 4 hours (60° C.) and absence of UV radiation for 4 hours (50° C.).

Example 1

For a linear medium-density polyethylene resin (A1), a resin having a melt index of 1.9 g/10 min (at 190° C. under a load of 5 kg), a differential scanning calorimetry (DSC) enthalpy of 150 joule/g and a molecular weight distribution of 3.5 and comprising an α-olefin having 8 carbon atoms as a comonomer was used.

For a high-density polyethylene resin (B1), a high-density polyethylene resin having a melt index of 0.2 g/10 min (at 190° C. under a load of 5 kg), a DSC enthalpy of 220 joule/g and a molecular weight distribution of 23 was used.

For an additive (C), an oxidation stabilizer, a heat stabilizer and a process aid were used. The additive was compounded with the resins to prepare a composition for a power cable.

The oxidation stabilizer comprised 0.2 part by weight of Irganox 1330 (Ciba-Geigy) as a primary antioxidant and 0.2 part by weight of Irganox 168 (Ciba-Geigy) as a secondary antioxidant. The heat stabilizer comprised 0.3 part by weight of a thioester AO412s (Adeka, Japan). And, the process aid comprised 0.1 part by weight of FX9613 (Dynamar).

For carbon black (D), one coated with titanium dioxide and having an average particle size of 18 nm, a surface area of 100 $m^2/g$ and a dibutyl phthalate (DBP) absorption amount of 150 cc/100 g was used. Test specimen for testing insulating property, dielectric property and discharge property was prepared with the aforesaid components. The result is given in Table 5.

Example 2

The same resins (A1, B1) as in Example 1 were used. Test specimen was prepared as in Table 2, and physical properties were tested as in Example 1.

Example 3

Test specimen was prepared in the same manner as Example 1, except for using a linear medium-density polyethylene (A2) having a melt index of 1.4 g/10 min (at 190° C. under a load of 5 kg), a DSC enthalpy of 190 joule/g and a molecular weight distribution of 19 and comprising an α-olefin having 8 carbon atoms as a comonomer as in Table 1, and physical properties were tested as in Example 1.

Example 4

Test specimen was prepared in the same manner as Example 1, except for using a high-density polyethylene resin (B2) having a melt index of 0.3 g/10 min (at 190° C. under a load of 5 kg), a DSC enthalpy of 200 joule/g and a molecular weight distribution of 5 as in Table 1, and physical properties were tested as in Example 1.

Example 5

Test specimen was prepared in the same manner as Example 1, except for using only the linear medium-density polyethylene resin (A1), and physical properties were tested as in Example 1.

Example 6

Test specimen was prepared in the same manner as Example 5, except for not using carbon black, and physical properties were tested as in Example 1.

TABLE 2

|   |   | Ex. 1 | | Ex. 2 | | Ex. 3 | | Ex. 4 | | Ex. 5 | | Ex. 6 | |
|---|---|---|---|---|---|---|---|---|---|---|---|---|---|
| A | MI | 1.9 | 70 wt % | 1.9 | 90 wt % | 1.4 | 75 wt % | 1.9 | 80 wt % | 1.9 | 100 wt % | 1.9 | 100 wt % |
|   | DSC | 150 | | 150 | | 190 | | 150 | | 150 | | 150 | |
|   | MWD | 3.5 | | 3.5 | | 19 | | 3.5 | | 3.5 | | 3.5 | |
| B | MI | 0.2 | 30 wt % | 0.2 | 10 wt % | 0.2 | 25 wt % | 0.3 | 20 wt % | | | | |
|   | DSC | 220 | | 220 | | 220 | | 200 | | | | | |
|   | MWD | 23 | | 23 | | 23 | | 5 | | | | | |
| C (pbw) | | 0.8 | | 0.8 | | 0.8 | | 0.8 | | 0.8 | | 0.8 | |
| D (pbw) | | 3 | | 3 | | 3 | | 3 | | 3 | | 3 | |

A: linear medium-density polyethylene
B: high-density polyethylene resin
C: additive
D: carbon black
MI: melt index (g/10 min, at 190° C. under a load of 5 kg)
DSC: DSC enthalpy (joule/g)
MWD: molecular weight distribution
pbw: parts by weight

Comparative Example 1

An 80% crosslinked polyethylene resin (peroxide crosslinked) which is currently used for an insulating layer of a 22.9 kV overhead cable and has improved tracking resistance enough to satisfy the KEPCO Standard (ES-6145-0021: ACSR/AW-TR/OC) was used.

Comparative Example 2

Test specimen was prepared using the linear medium-density polyethylene resin (A1) and the high-density polyethylene resin (B1) of Example 1 as in Table 3, and physical properties were tested as in Example 1.

Comparative Example 3

Test specimen was prepared in the same manner as Example 1, except for using a linear medium-density polyethylene (a1) having a melt index of 1.8 g/10 min (at 190° C. under a load of 5 kg), a DSC enthalpy of 120 joule/g and a molecular weight distribution of 3.5 and comprising an α-olefin having 8 carbon atoms as a comonomer as in Table 3, and physical properties were tested as in Example 1.

Comparative Example 4

Test specimen was prepared using the linear medium-density polyethylene resin (A1) of Example 1 and a high-density polyethylene resin (b1) having a melt index of 0.2 g/10 min (at 190° C. under a load of 5 kg), a DSC enthalpy of 260 joule/g and a molecular weight distribution of 3, and physical properties were tested as in Example 1.

Comparative Example 5

Test specimen was prepared using a linear medium-density polyethylene (a2) having a melt index of 0.8 g/10 min (at 190° C. under a load of 5 kg), a DSC enthalpy of 205 joule/g and a molecular weight distribution of 3.0, and physical properties were tested as in Example 1.

Comparative Example 6

Test specimen was prepared using a linear medium-density polyethylene (a3) having a melt index of 3.0 g/10 min (at 190° C. under a load of 5 kg), a DSC enthalpy of 150 joule/g and a molecular weight distribution of 3.7, and physical properties were tested as in Example 1.

Comparative Example 7

Test specimen was prepared using the linear medium-density polyethylene resin (A1) of Example 1 and a high-density polyethylene resin (b2) having a melt index of 0.3 g/10 min (at 190° C. under a load of 5 kg), a DSC enthalpy of 180 joule/g and a molecular weight distribution of 4, and physical properties were tested as in Example 1.

Comparative Example 8

Test specimen was prepared using the linear medium-density polyethylene resin (A1) of Example 1 and a high-density polyethylene resin (b3) having a melt index of 0.1 g/10 min (at 190° C. under a load of 5 kg), a DSC enthalpy of 210 joule/g and a molecular weight distribution of 2.1, and physical properties were tested as in Example 1.

TABLE 3

|   |       | Comp. Ex. 2 |       | Comp. Ex. 3 |       | Comp. Ex. 4 |       | Comp. Ex. 5 |       |
|---|-------|-------------|-------|-------------|-------|-------------|-------|-------------|-------|
| A | MI    | 1.9         | 40 wt % | 1.8       | 90 wt % | 1.9       | 70 wt % | 0.8       | 80 wt % |
|   | DSC   | 150         |       | 120         |       | 150         |       | 205         |       |
|   | MWD   | 3.5         |       | 3.5         |       | 3.5         |       | 3.0         |       |
| B | MI    | 0.2         | 60 wt % | 0.2       | 10 wt % | 0.2       | 30 wt % | 0.2       | 20 wt % |
|   | DSC   | 220         |       | 220         |       | 260         |       | 220         |       |
|   | MWD   | 23          |       | 23          |       | 3           |       | 23          |       |
|   | C (pbw) |           | 0.8   |             | 0.8   |             | 0.8   |             | 0.8   |
|   | D (pbw) |           | 3     |             | 3     |             | 3     |             | 3     |

A: linear medium-density polyethylene
B: high-density polyethylene resin
C: additive
D: carbon black
MI: melt index (g/10 min, at 190° C. under a load of 5 kg)
DSC: DSC enthalpy (joule/g)
MWD: molecular weight distribution
pbw: parts by weight

TABLE 4

|   |       | Comp. Ex. 6 |       | Comp. Ex. 7 |       | Comp. Ex. 8 |       |
|---|-------|-------------|-------|-------------|-------|-------------|-------|
| A | MI    | 3           | 70 wt % | 1.9       | 90 wt % | 1.9       | 60 wt % |
|   | DSC   | 150         |       | 150         |       | 150         |       |
|   | MWD   | 3.7         |       | 3.5         |       | 3.5         |       |
| B | MI    | 0.2         | 30 wt % | 0.3       | 10 wt % | 0.1       | 40 wt % |
|   | DSC   | 220         |       | 180         |       | 210         |       |
|   | MWD   | 23          |       | 4           |       | 2.1         |       |
|   | C (pbw) |           | 0.8   |             | 0.8   |             | 0.8   |
|   | D (pbw) |           | 3     |             | 3     |             | 3     |

A: linear medium-density polyethylene
B: high-density polyethylene resin
C: additive
D: carbon black
MI: melt index (g/10 min, at 190° C. under a load of 5 kg)
DSC: DSC enthalpy (joule/g)
MWD: molecular weight distribution
pbw: parts by weight

TABLE 5

| | Test item | Ex. 1 | Ex. 2 | Ex. 3 | Ex. 4 | Ex. 5 | Ex. 6 |
|---|---|---|---|---|---|---|---|
| Insulating property | Dielectric breakdown (kV/mm, 63.2%) | 94.3 | 87.2 | 90.0 | 86 | 81.8 | 83 |
| | Insulation resistance (Ωcm) | $1.65 \times 10^{17}$ | $1.61 \times 10^{17}$ | $1.61 \times 10^{17}$ | $1.50 \times 10^{17}$ | $1.57 \times 10^{17}$ | $1.63 \times 10^{17}$ |
| Dielectric property | Permittivity | 2.2 | 2.3 | 2.4 | 2.3 | 2.1 | 2.2 |
| | Dielectric loss (tanδ) | $1.1 \times 10^{-3}$ | $1.1 \times 10^{-3}$ | $1.1 \times 10^{-3}$ | $1.1 \times 10^{-3}$ | $1.0 \times 10^{-3}$ | $1.0 \times 10^{-3}$ |
| Discharge property | Tracking resistance | Pass (≥8.0 hr) | Pass (7.0 hr) | Pass (7.0 hr) | Pass (6.5 hr) | Pass (6.0 hr) | Pass (6.0 hr) |
| Heat resistance I (after heating) | Tensile strength (kgf/mm²) | 3.6 | 3.4 | 3.5 | 3.1 | 3.3 | 3.0 |
| | Elongation (%) | 720 | 810 | 700 | 830 | 830 | 770 |
| (room temperature) | Tensile strength (kgf/mm²) | 3.7 | 3.4 | 3.5 | 2.9 | 3.4 | |
| | Elongation (%) | 730 | 815 | 834 | 830 | 831 | 780 |
| Heat resistance II (5,000 hr) | Elongation (%) | 710 | 760 | 810 | 780 | 750 | 700 |
| Heat resistance II (10,000 hr) | Elongation (%) | 680 | 740 | 780 | 750 | 780 | 660 |
| Processability | Surface appearance | Very Good | Very Good | Very Good | Very Good | Very Good | Good |

TABLE 6

| | Test item | Comp. Ex. 1 | Comp. Ex. 2 | Comp. Ex. 3 |
|---|---|---|---|---|
| Insulating property | Dielectric breakdown (kV/mm, 63.2%) | 76.7 | 102 | — |
| | Insulation resistance (Ωcm) | $1.38 \times 10^{17}$ | $1.58 \times 10^{17}$ | — |
| Dielectric property | Permittivity | 2.2 | 2.3 | — |
| | Dielectric loss (tanδ) | $1.0 \times 10^{-3}$ | $1.2 \times 10^{-3}$ | — |
| Discharge property | Tracking resistance | Fail (4.0 hr) | Pass (7.0 hr) | Fail (4.0 hr) |
| Heat resistance I (after heating) | Tensile strength (kgf/mm²) | 1.9 | 3.8 | — |
| | Elongation (%) | 560 | 650 | — |
| (room temperature) | Tensile strength (kgf/mm²) | 1.8 | 3.9 | — |
| | Elongation (%) | 561 | 650 | — |
| Heat resistance II (5,000 hr) | Elongation (%) | — | 350 | — |
| Heat resistance II (10,000 hr) | Elongation (%) | — | 250 | — |
| Processability | Surface appearance | — | Very Good | Very Good |

TABLE 7

| | Test item | Comp. Ex. 4 | Comp. Ex. 5 | Comp. Ex. 6 | Comp. Ex. 7 | Comp. Ex. 8 |
|---|---|---|---|---|---|---|
| Insulating property | Dielectric breakdown (kV/mm, 63.2%) | 95 | — | — | 82.5 | 95.0 |
| | Insulation resistance (Ωcm) | $1.55 \times 10^{17}$ | — | — | $1.57 \times 10^{17}$ | $1.625 \times 10^{17}$ |
| Dielectric property | Permittivity | 2.3 | — | 2.3 | 2.2 | 2.4 |
| | Dielectric loss (tanδ) | $1.1 \times 10^{-3}$ | — | $1.1 \times 10^{-3}$ | $1.0 \times 10^{-3}$ | $1.1 \times 10^{-3}$ |
| Discharge property | Tracking resistance | Pass (6.0 hr) | Pass (7.0 hr) | Fail (4.0 hr) | Fail (4.5 hr) | Pass (7.0 hr) |
| Heat resistance I (after heating) | Tensile strength (kgf/mm²) | 3.7 | 3.8 | — | 3.5 | 3.8 |
| | Elongation (%) | 670 | 630 | — | 790 | 680 |

TABLE 7-continued

| Test item | | Comp. Ex. 4 | Comp. Ex. 5 | Comp. Ex. 6 | Comp. Ex. 7 | Comp. Ex. 8 |
|---|---|---|---|---|---|---|
| (room temperature) | Tensile strength (kgf/mm$^2$) | 3.5 | 3.8 | — | 3.6 | 3.8 |
| | Elongation (%) | 670 | 650 | — | 802 | 740 |
| Heat resistance II (5,000 hr) | Elongation (%) | 380 | 420 | — | 720 | 680 |
| Heat resistance II (10,000 hr) | Elongation (%) | 220 | 260 | — | 690 | 620 |
| Processability | Surface appearance | — | Moderate | Very Good | Very Good | Bad |

As seen from Tables 5 to 7, the compositions according to the present invention exhibited physical properties comparable to or better than those of existing crosslinked polyethylene compositions although uncrosslinked type polyethylene resin was used. In particular, they showed better insulating property, discharge property and heat resistance than the currently used crosslinked polyethylene composition of Comparative Example 1. In addition, the compositions according to the present invention exhibited superior weather resistance.

The present application contains subject matter related to Korean Patent Application No. 10-2009-0025128, filed in the Korean Intellectual Property Office on Mar. 24, 2009, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention provides uncrosslinked type polyethylene resin composition, which is recyclable thus being environment-friendly and has superior insulating property, dielectric property and discharge property as well as good heat resistance.

The invention claimed is:

1. Uncrosslinked polyethylene composition for a power cable comprising:
   100 parts by weight of a polymer comprising a linear medium-density polyethylene resin comprising an α-olefin having 4 or more carbon atoms as a comonomer and having a melt index of 1.4-1.9 g/10 min (at 190° C. under a load of 5 kg), a differential scanning calorimetry (DSC) enthalpy of 130-190 joule/g and a molecular weight distribution of 2-30; and
   0.1 to 10 parts by weight of one or more additive(s) selected from a flame retardant, an oxidation stabilizer, a UV stabilizer, a heat stabilizer and a process aid.

2. The uncrosslinked polyethylene composition for a power cable according to claim 1, which further comprises 5 to 40 wt % of a high-density polyethylene resin having a melt index of 0.1-0.35 g/10 min (at 190° C. under a load of 5 kg), a DSC enthalpy of 190-250 joule/g and a molecular weight distribution of 3-30, based on 100 parts by weight of the polymer.

3. The uncrosslinked polyethylene composition for a power cable according to claim 2, wherein the high-density polyethylene resin has a melt index 0.2-0.3 g/10 min (at 190° C. under a load of 5 kg), a DSC enthalpy of 200-220 joule/g and a molecular weight distribution of 5-23.

4. The uncrosslinked polyethylene composition for a power cable according to claim 2, which further comprises 1 to 5 parts by weight of carbon black, based on 100 parts by weight of the polymer.

5. A power cable prepared using the uncrosslinked polyethylene composition according to claim 2.

6. A multilayer power cable having the uncrosslinked polyethylene composition according to claim 2 applied in an insulating layer, a semi-conducting layer or a sheath layer.

7. The uncrosslinked polyethylene composition for a power cable according to claim 1, which further comprises 1 to 5 parts by weight of carbon black, based on 100 parts by weight of the polymer.

8. A power cable prepared using the uncrosslinked polyethylene composition according to claim 7.

9. A multilayer power cable having the uncrosslinked polyethylene composition according to claim 7 applied in an insulating layer, a semi-conducting layer or a sheath layer.

10. The uncrosslinked polyethylene composition for a power cable according to claim 1, wherein the α-olefin having 4 or more carbon atoms is selected from butene, pentene, methylpentene, hexene, octene and decene.

11. A power cable prepared using the uncrosslinked polyethylene composition according to claim 10.

12. A multilayer power cable having the uncrosslinked polyethylene composition according to claim 10 applied in an insulating layer, a semi-conducting layer or a sheath layer.

13. The uncrosslinked polyethylene composition for a power cable according to claim 1, wherein the linear medium-density polyethylene resin comprises an α-olefin having 4 or more carbon atoms as a comonomer and has a DSC enthalpy of 150-190 joule/g and a molecular weight distribution of 3.5-23.

14. A power cable prepared using the uncrosslinked polyethylene composition according to claim 1.

15. A multilayer power cable having the uncrosslinked polyethylene composition according to claim 1 applied in an insulating layer, a semi-conducting layer or a sheath layer.

* * * * *